Figure 1:
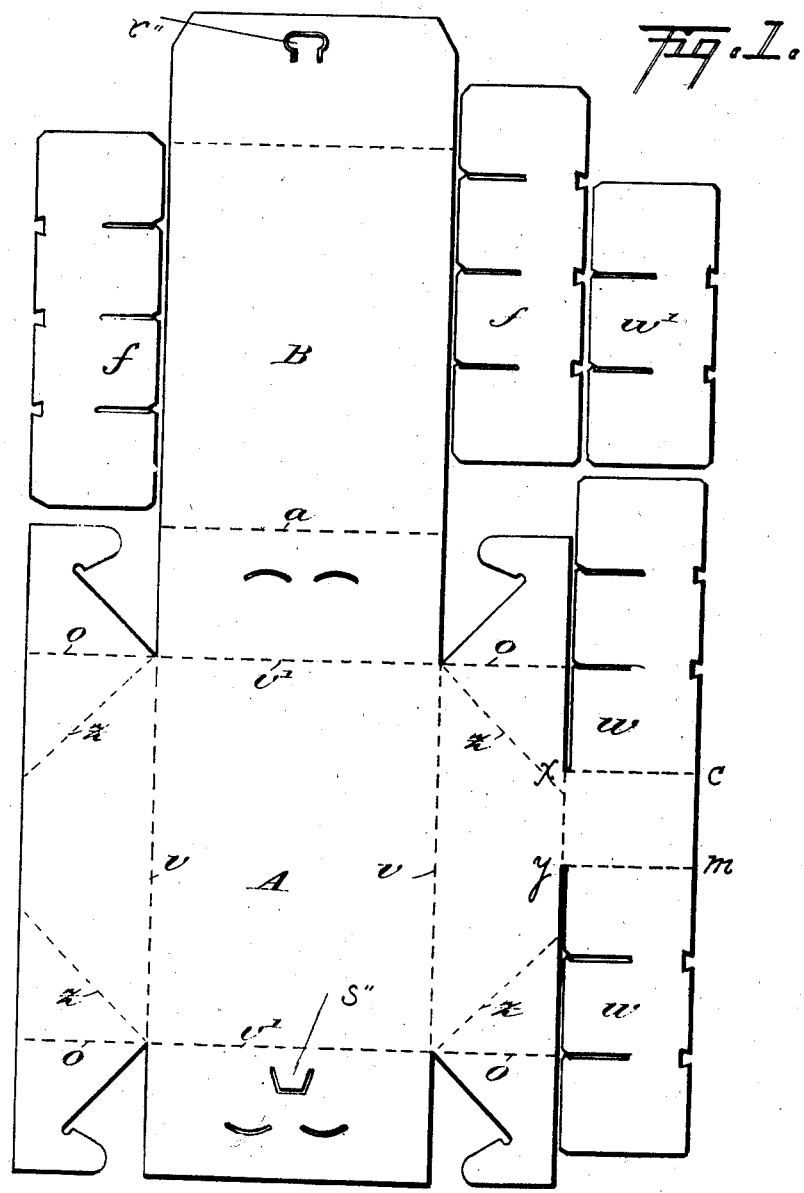

No. 893,870. PATENTED JULY 21, 1908.
W. G. POST.
COLLAPSIBLE BOX.
APPLICATION FILED AUG. 10, 1906.

2 SHEETS—SHEET 1.

WITNESSES:
Grace Love.
L. M. Thyer

INVENTOR
Warren G. Post
BY
C. Francis Jenkins
ATTORNEY

No. 893,870. PATENTED JULY 21, 1908.
W. G. POST.
COLLAPSIBLE BOX.
APPLICATION FILED AUG. 10, 1906.
2 SHEETS—SHEET 2.
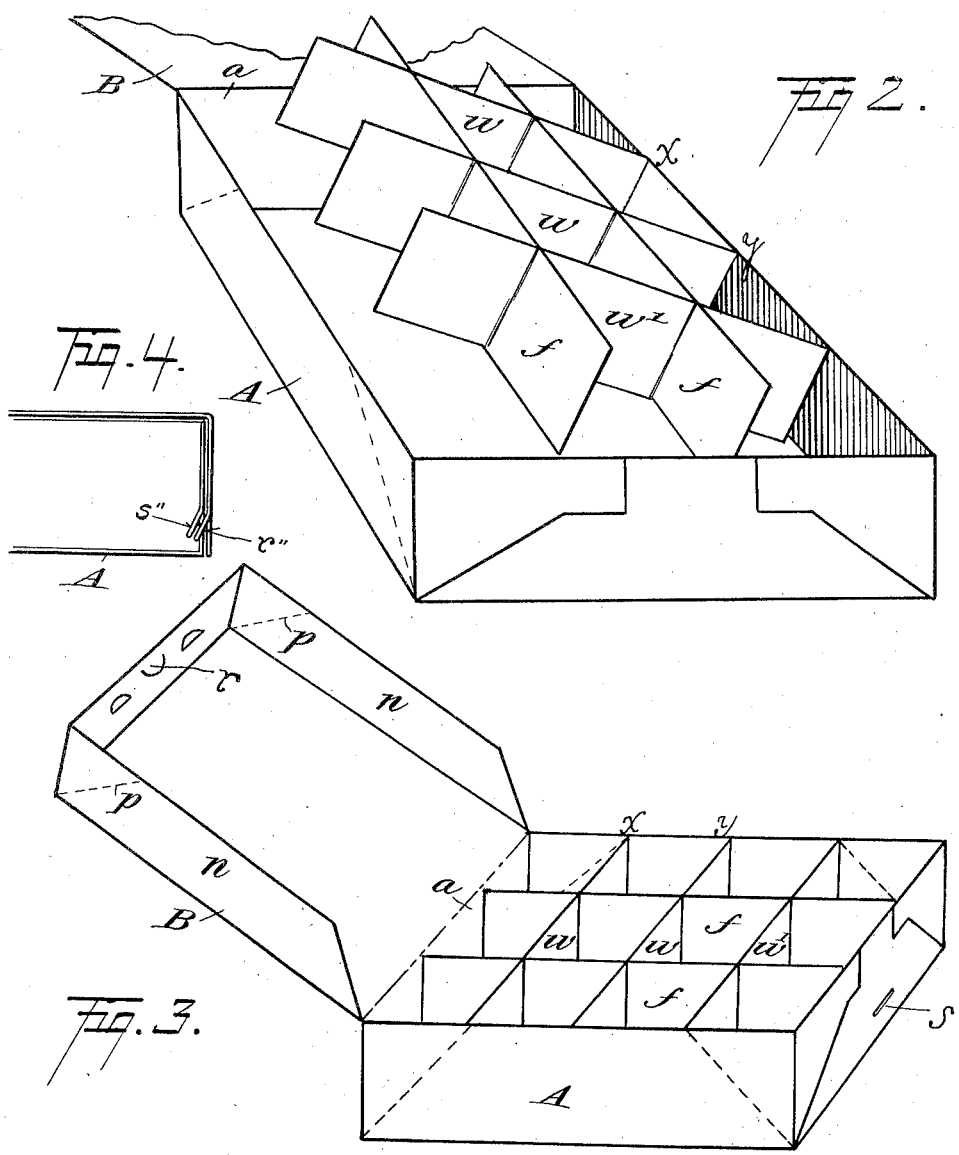
WITNESSES:
Grace Love.
L. M. Thyer
INVENTOR
Warren G. Post
BY
P. Francis Jenkins
ATTORNEY

UNITED STATES PATENT OFFICE.

WARREN GUY POST, OF MEDINA, NEW YORK.

COLLAPSIBLE BOX.

No. 893,870.  Specification of Letters Patent.  Patented July 21, 1908.

Application filed August 10, 1906. Serial No. 330,002.

*To all whom it may concern:*

Be it known that I, WARREN GUY POST, a citizen of United States, residing at Medina, in the county of Orleans and State of New York, have invented certain new and useful Improvements in Collapsible Boxes, of which the following is a specification.

This invention relates to collapsible boxes, for eggs and the like, each provided with a cell structure inseparable from the box and adapted to be collapsed when outside the box and to rest in open condition in the non-collapsed box.

The principal objects of the invention are to prevent the cell structure from becoming separated from the box and lost, and to reduce the usual cost of devices of this general class.

In the accompanying drawings, Figure 1 shows the box and cell-structure blanks in the relative positions which they occupy when cut from a strip or sheet of stock, the dotted lines being lines along which the blanks are scored. Fig. 2 shows an open box with a part of the cover broken away and with the swinging cell structure opened but not fully within the box. Fig. 3 shows a slightly modified complete apparatus the box being open. Fig. 4 is a vertical section through the fastening devices, the box being closed.

As clearly appears in Fig. 1, the box A and its cover B are integrally formed and to the former are integrally connected along the scored line $x$—$y$, the cell-structure strips $w$ which are, in use, to be parallel to the hinge line $a$ of the cover. These strips $w$ are folded at right angles along scored lines $x$—$c$, $y$—$m$, and with them the independently formed cross strips $f$, $w'$ are interlocked in the usual way to form a complete cell-structure. The body blank is bent at right angles along the scored lines $v$, and its ends are interlocked as usual. The cell-structure being swung, on the axis $x$—$y$, out of the box is readily collapsed to flat form, and the body of the box is also made flat by bending its lateral walls inwardly on the scored lines $z$ thereby folding down the four sides, by bending along the lines $v$, $v'$, $o$; and this operation also brings the folded cell-structure into position to lie flat upon the folded box and its cover.

When the box is in use the cover is held closed by a locking tongue $r''$, of the cover flap, engaging in a suitable slot $s''$ in the box end.

In Fig. 3 the cover is shown as provided with hinged side-walls $n$ which fold inward by bending along scored lines $p$, a construction which does not change the folding before described. This figure also shows a simple tongue $r$ for engaging in a slot $s$ and holding the cover closed. Usually all the parts for a complete box and cell structure are cut from the stock and scored by one stroke of a die.

What I claim is:

1. The combination with a box adapted to assume plane form by folding, of a collapsible cell structure, made up of interlocked strips, hinged at one side, and approximately in the plane of one of its broader faces, to the margin of one wall of the box to swing into the uncollapsed box and when itself uncollapsed fit within the same.

2. The combination with a box having a hinged cover and adapted to be collapsed to flat form as a whole by simple folding, of a cell structure, consisting of interlocked cell strips, hinged to one edge of the box wall at a point not covered by the folding parts of the box and arranged to swing into and fit the interior of the box when both box and cell structure are uncollapsed.

3. The combination with a box adapted to be collapsed to flat form by folding, of a cell structure made up of interlocked strips arranged to be collapsed to flat form, by movement in the plane of the structure, to lie upon the collapsed box; said structure being hinged at one side to the edge of one wall of the box, to swing into and out of the box when the latter is uncollapsed.

In testimony whereof I have affixed my signature in presence of two witnesses.

WARREN GUY POST.

Witnesses:
B. E. HARCOURT,
ELIZABETH B. ALLEN.